US011931852B2

(12) United States Patent
Jiang et al.

(10) Patent No.: US 11,931,852 B2
(45) Date of Patent: Mar. 19, 2024

(54) DEVICE FOR CUTTING CONNECTION OF MULTI-PIECE MODULE ELECTRODE

(71) Applicants: HUNAN BRUNP EV RECYCLING CO., LTD., Hunan (CN); GUANGDONG BRUNP RECYCLING TECHNOLOGY CO., LTD., Guangdong (CN); HUNAN BRUNP RECYCLING TECHNOLOGY CO., LTD., Hunan (CN)

(72) Inventors: Xiaolin Jiang, Hunan (CN); Changdong Li, Guangdong (CN)

(73) Assignees: HUNAN BRUNP EV RECYCLING CO., LTD., Hunan (CN); GUANGDONG BRUNP RECYCLING TECHNOLOGY CO., LTD., Guangdong (CN); HUNAN BRUNP RECYCLING TECHNOLOGY CO., LTD., Hunan (CN)

( * ) Notice: Subject to any disclaimer, the term of this patent is extended or adjusted under 35 U.S.C. 154(b) by 0 days.

(21) Appl. No.: 18/029,646

(22) PCT Filed: May 12, 2021

(86) PCT No.: PCT/CN2021/093181
§ 371 (c)(1),
(2) Date: Mar. 30, 2023

(87) PCT Pub. No.: WO2022/105150
PCT Pub. Date: May 27, 2022

(65) Prior Publication Data
US 2023/0364730 A1 Nov. 16, 2023

(30) Foreign Application Priority Data
Nov. 23, 2020 (CN) .......................... 202011322655.2

(51) Int. Cl.
*B24B 27/02* (2006.01)
*B24B 27/06* (2006.01)
(Continued)

(52) U.S. Cl.
CPC .............. *B24B 27/02* (2013.01); *B24B 27/06* (2013.01); *B24B 41/005* (2013.01); *B24B 41/068* (2013.01); *H01M 10/0404* (2013.01)

(58) Field of Classification Search
CPC ..... B24B 27/02; B24B 27/06; B24B 27/0015; B24B 27/0023; B24B 27/0076;
(Continued)

(56) References Cited

U.S. PATENT DOCUMENTS

2015/0079884 A1* 3/2015 Buxton ................... B24B 5/363
451/426
2017/0305035 A1* 10/2017 Toncelli ................... B28D 1/04
(Continued)

FOREIGN PATENT DOCUMENTS

CN 102931450 A * 2/2013
CN 102931450 A 2/2013
(Continued)

OTHER PUBLICATIONS

International Search Report and Written Opinion of the International Searching Authority issued by the China National Intellectual Property Administration for International Patent Application No. PCT/CN2021/093181, dated Jul. 27, 2021, with an English translation.

*Primary Examiner* — Joel D Crandall
*Assistant Examiner* — Michael A Gump
(74) *Attorney, Agent, or Firm* — MYERS WOLIN, LLC (57) ABSTRACT

The present disclosure discloses a device for cutting connection of multi-piece module electrode which includes a stand, the stand is provided with a workbench and the
(Continued)

workbench is connected with a height adjusting device. The device further includes an angle grinding device, the angle grinding device includes a polishing shaft and an angle grinder, the angle grinder is arranged on the polishing shaft, and the angle grinding device is provided with a saw blade. According to the characteristics of the module electrode, the angle grinding device is matched with the workbench to implement simultaneous electrode disconnecting operation of multiple electrodes of the module, so that the device not only has higher efficiency and better cutting effect, but also is suitable for universal saw blades, saves the cost, and is safer.

10 Claims, 5 Drawing Sheets (51) Int. Cl.
  *B24B 41/00* (2006.01)
  *B24B 41/06* (2012.01)
  *H01M 10/04* (2006.01)
(58) Field of Classification Search
  CPC ............ B24B 27/0608; B24B 27/0691; B24B 41/005; B24B 41/0608; B24B 41/068; B24B 41/02; H01M 10/0404; Y10T 83/9374; Y10T 83/9377; B27B 5/34

USPC ....... 451/177, 482, 483, 186, 179, 342, 361; 83/663–665

See application file for complete search history.

(56) References Cited

U.S. PATENT DOCUMENTS

| | | | |
|---|---|---|---|
| 2020/0016718 A1* | 1/2020 | Toncelli | ................. B24B 7/224 |
| 2023/0231215 A1* | 7/2023 | Yu | ............................. B09B 3/35 |
| | | | 429/49 |

FOREIGN PATENT DOCUMENTS

| | | | | | |
|---|---|---|---|---|---|
| CN | 203409808 U | | 1/2014 | | |
| CN | 205904590 U | | 1/2017 | | |
| CN | 106785165 A | | 5/2017 | | |
| CN | 108214253 A | * | 6/2018 | | |
| CN | 109940770 A | | 6/2019 | | |
| CN | 110216561 A | * | 9/2019 | ......... | B24B 27/0015 |
| CN | 209477949 U | | 10/2019 | | |
| CN | 110860740 A | | 3/2020 | | |
| CN | 112372463 A | | 2/2021 | | |
| JP | H11-224698 A | | 8/1999 | | |
| JP | 2018034297 A | * | 3/2018 | ............ | B24B 49/00 |
| KR | 20040018315 A | * | 3/2004 | | |
| WO | WO-2009028365 A1 | * | 3/2009 | ......... | B24B 27/0608 |
| WO | 2022/105150 A1 | | 5/2022 | | |

* cited by examiner

DEVICE FOR CUTTING CONNECTION OF MULTI-PIECE MODULE ELECTRODE

CROSS-REFERENCE TO RELATED APPLICATIONS

This application is a National Stage under 35 U.S.C. § 371 of International Application Number PCT/CN2021/093181, filed on May 12, 2021, and which designated the U.S., which claims priority to Chinese Patent Application No. 202011322655.2, filed on Nov. 23, 2020. The contents of each are incorporated herein by reference in their entirety.

TECHNICAL FIELD

The present disclosure relates to the field of battery technologies, and more particularly, to a device for cutting connection of module electrodes of a decommissioned power battery.

BACKGROUND

For the sake of energy conservation and environmental protection, more and more attentions have been paid to the cascade utilization of decommissioned power batteries. However, there are few decommissioned modules that can be directly used in cascade, and most of the decommissioned modules are used in the form of single batteries, so the battery modules are usually disassembled into single batteries before being used in cascade. In order to disassemble the modules into single electrodes, an essential step is to mill off aluminum pole pieces on the modules to cut off the mechanical connection between the single electrodes, and meanwhile, to make a surface of each separated single electrode smooth for subsequent cascade utilization.

However, when a module is directly milled with a milling cutter on a milling machine, and specifically, when the milling cutter passes through a gap between cathodes and anodes of two adjacent single batteries, the milling cutter itself will electrically connect the cathodes and anodes of the two adjacent single batteries to form a short circuit between the milling cutter and the pole pieces to generate sparks, which will easily cause the milling cutter to anneal and immediately scrap, and even cause potential fire safety hazards. For the safety of the aluminum pole piece milling process, it is necessary to pretreat the pole pieces of the module, specifically, disconnect the aluminum pole piece on one side of the module (hereinafter referred to as "broken pole"), so as to avoid short circuit when milling the aluminum pole piece on the other side.

Currently, the method used in the pole disconnecting process is to disconnect an arch-shaped connection of the pole pieces manually with tools (pliers, shovels, angle grinder, and the like). The manual operation is slow in speed, high in labor intensity, poor in pole disconnecting effect, and irregular in shapes after pole disconnecting, which is not conducive to the subsequent milling of the pole pieces on the milling machine. Meanwhile, manually prying off the pole piece will sometimes cause damage to the battery electrode itself. In addition, the efficiency of cutting and disconnecting poles by hand-held angle grinder is not high enough. Moreover, because a grinding wheel used in the angle grinder is generally a resin saw blade (which cannot be a metal saw blade because the metal saw blade has a large reaction force when cutting metal, and causes the rotating angle grinder to hurt people if the metal saw blade is not carefully held by hand). The resin saw blade is a consumable component, and wears quickly during cutting, so the resin saw blade needs to be replaced frequently, which also affects the working efficiency and increases the operation cost.

SUMMARY

To overcome the deficiencies of the existing technology, the present disclosure provides a device for cutting connection of multi-piece module electrodes, which is particularly applied to an electrode disconnecting operation of a battery module.

The technical solution used in the present disclosure to solve the technical problems thereof is: to provide a device for cutting connection of multi-piece module electrodes which includes a stand. The stand is provided with a workbench and the workbench is connected with a height adjusting device; and the device further includes an angle grinding device, wherein the angle grinding device includes a polishing shaft and an angle grinder, the angle grinder is arranged on the polishing shaft, spacing between the angle grinders is adjustable along the polishing shaft, and the angle grinder is provided with a saw blade; and the workbench or the angle grinding device is provided with a translation feed device configured for controlling a translation movement of the workbench or the angle grinding device.

According to the device for cutting provided by the present disclosure, and according to the characteristics of the module electrodes, a plurality of electrodes of the module can be cut off at the same time by adopting the angle grinding device in cooperation with the workbench, which is not only higher in efficiency and better in cutting effect, but also suitable for general saw blades, saves cost and is safer; and the spacing between the saw blades of the angle grinding machine can be adjusted along the polishing shaft to adapt to different modules.

As some preferred embodiments of the present disclosure, the angle grinder is provided with an angle grinder fixed mount, the angle grinder fixed mount includes a square tube and an angle grinder slider, the angle grinder is inserted into the square tube, and the angle grinder slider is sheathed on the polishing shaft.

As some preferred embodiments of the present disclosure, the polishing shaft extends along left and right directions, at least two polishing shafts are corresponding to one angle grinder, and the polishing shafts are arranged along upper and lower directions.

As some preferred embodiments of the present disclosure, a plurality of groups of polishing shafts are included, each group of the polishing shafts is corresponding to a plurality of the angle grinders, and each group of the polishing shafts is arranged along front and back directions.

As some preferred embodiments of the present disclosure, the angle grinding device includes a polishing shaft frame, and the polishing shaft is arranged in the polishing shaft frame.

As some preferred embodiments of the present disclosure, the stand is provided with a portal frame, and the angle grinding device is arranged on the portal frame.

As some preferred embodiments of the present disclosure, the stand is provided with a longitudinal guide rod, the longitudinal guide rod is provided with a longitudinal translation frame, the longitudinal translation frame is provided with a transverse guide rail, the transverse guide rail is provided with a transverse translation frame, the workbench is arranged on the transverse translation frame, and the height adjusting device is arranged between the workbench and the transverse translation frame.

As some preferred embodiments of the present disclosure, the workbench is provided with an L-shaped fixing plate, and the workbench is provided with a movable clamping plate.

As some preferred embodiments of the present disclosure, the height adjusting device includes a height adjusting screw rod and a lifting guide rod.

As some preferred embodiments of the present disclosure, the longitudinal translation frame is provided with a longitudinal translation cylinder, the longitudinal translation frame is provided with a trapezoidal screw rod, the trapezoidal screw rod is provided with a hand wheel, the trapezoidal screw rod is provided with a trapezoidal nut, and the trapezoidal nut is connected with the transverse translation frame.

The present disclosure has the beneficial effects that:
1. Compared with the operation of the hand-held angle grinder, the new device is suitable for multiple motors of the modules to cut at the same time, with higher cutting efficiency and better cutting effect, and is especially suitable for modules with arched connecting pieces (electrodes).
2. Because mechanical operation is adopted instead of the hand-held angle grinder, a saw blade for cutting aluminum alloy instead of the resin saw blade is used as the saw blade of the angle grinder, thus reducing the use cost and the times of replacing the saw blade, and significantly improving the working efficiency.
3. The spacing between the saw blades of the angle grinder can be adjusted according to the electrode characteristics of different modules, such as different sizes and numbers of single modules, different lengths, widths and heights of pole piece spacing, and the like, so that the applicability is better.
4. The design of staggered layout between two rows (multiple rows) of angle grinders is employed for the angle grinding device, which can cut off modules with very small d value, and meanwhile, can complete the pole disconnecting work of the module pole pieces in one feeding cutting, thus expanding the application scope of the technology and significantly improving the operating efficiency of pole disconnecting.

BRIEF DESCRIPTION OF DRAWINGS

The present disclosure is further described hereinafter with reference to the drawings and the embodiments.

REFERENCE NUMERALS

100 refers to stand, 110 refers to portal frame, 200 refers to workbench, 210 refers to L-shaped fixing plate, 220 refers to clamping piece, 300 refers to height adjusting device, 310 refers to height adjusting screw rod, 320 refers to lifting guide rod, 400 refers to angle grinding device, 410 refers to polishing shaft, 420 refers to angle grinder, 421 refers to saw blade, 430 refers to angle grinder fixed mount, 431 refers to square tube, 432 refers to angle grinder slider, 440 refers to polishing shaft frame, 500 refers to longitudinal translation frame, 510 refers to longitudinal guide rod, 520 refers to longitudinal translation cylinder, 600 refers to transverse translation frame, 610 refers to transverse guide rail, 620 refers to trapezoidal screw rod, 621 refers to hand wheel, 700 refers to module, and 701 refers to electrode.

DETAILED DESCRIPTION

To make the objects, technical solutions, and advantages of the present application clearer, the following further describes some embodiments of the present disclosure in detail with reference to the accompanying drawings and embodiments. In order to understand the present disclosure thoroughly, some specific details will be involved in the following description. Without these specific details, the present disclosure can still be realized, that is, those skilled in the art can use these descriptions and statements here to more effectively introduce the essence thereof to others skilled in the art. In addition, it should be noted that the words "front side", "back side", "left side", "right side", "upper side" and "lower side" used in the following description refer to the directions in the drawings, and the words "inside" and "outside" refer to the directions towards or far away from a geometric center of a specific part respectively. Simple adjustment of the above direction made by those skilled in the related art without any creativity work should not be understood as a technology beyond the protection scope of the present application. It should be understood that the specific embodiments described herein are merely illustrative of the present application and are not intended to limit the protection scope of the present application. In order to avoid confusing the object of the present disclosure, the well-known technologies such as manufacturing method, control program, component size, material composition, pipeline layout, and the like, are not described in detail since they have been easily understood.

Figure 1:
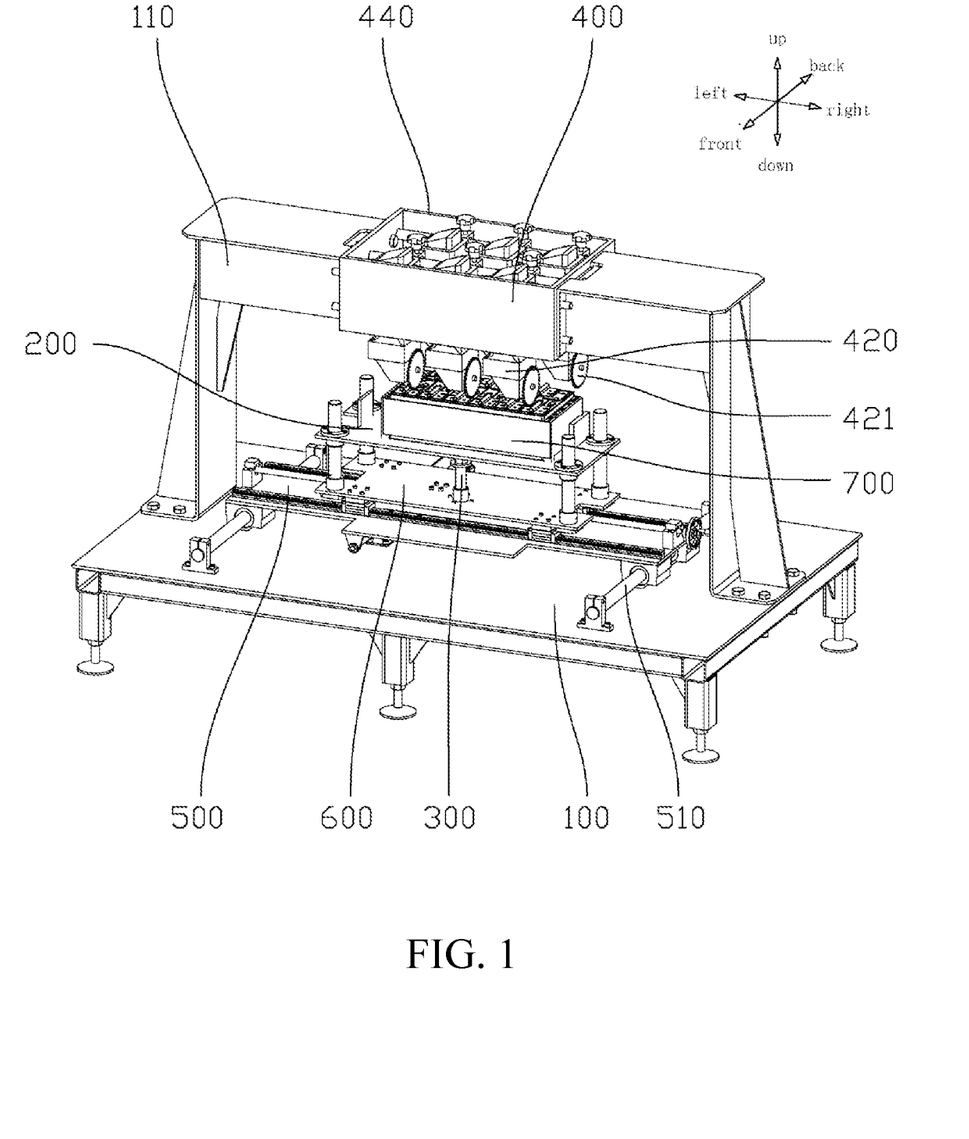
FIG. 1 is a three-dimensional diagram of the present disclosure.

FIG. 1 is a three-dimensional diagram of an embodiment of the present disclosure. Referring to FIG. 1, an embodiment of the present disclosure provides a device for cutting connection of multi-piece module electrodes, which includes a stand 100. The stand 100 is provided with a workbench 200, and the workbench 200 is connected with a height adjusting device 300. The height adjusting device 300 is used for adjusting a height of the workbench 200 to match with battery modules of different heights. The workbench 200 is used for fixing a battery module waiting for pole disconnecting.

Figure 2:
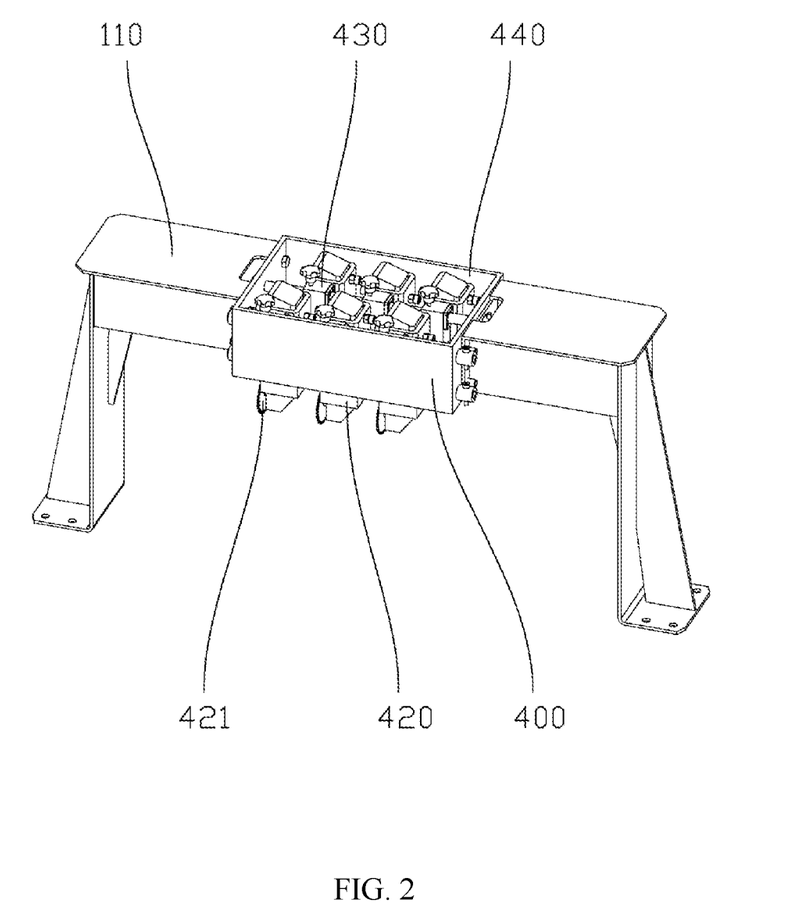
FIG. 2 is a three-dimensional diagram of an angle grinding device in the present disclosure.
Figure 3:
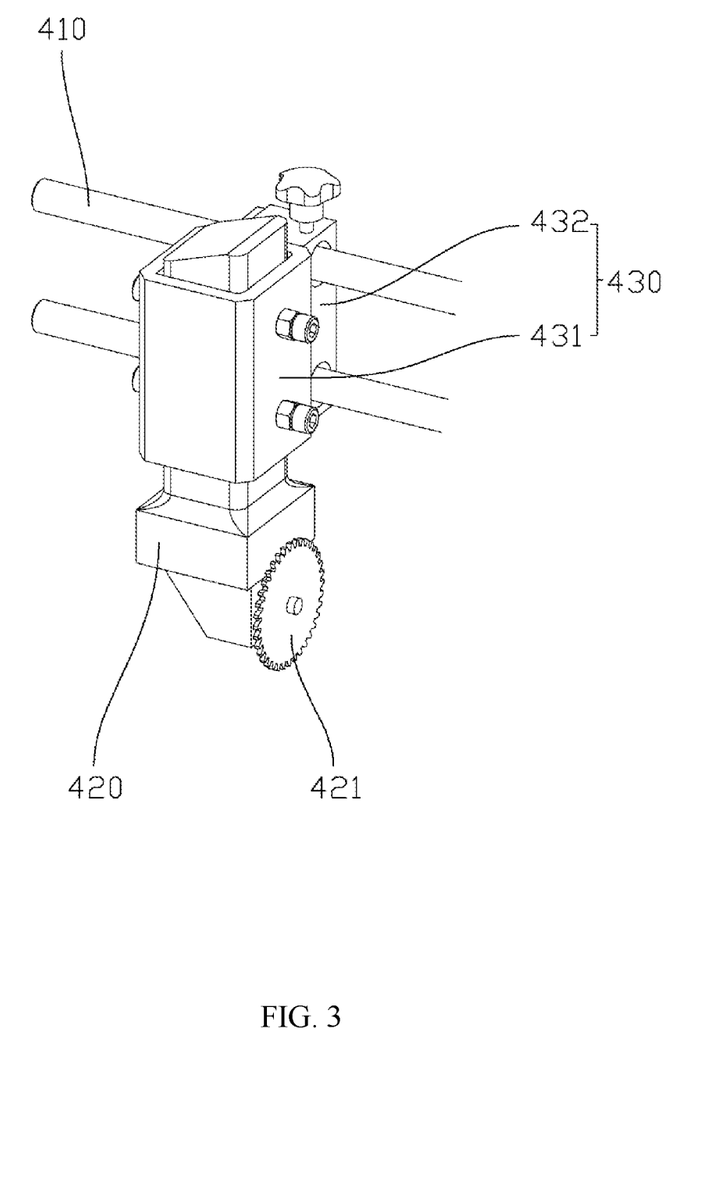
FIG. 3 is a three-dimensional diagram of an angle grinder in the present disclosure.

Further, referring to FIG. 2 and FIG. 3, the device for cutting connection of the multi-piece module electrodes further includes an angle grinding device 400. The angle grinding device 400 includes a polishing shaft 410 and an angle grinder 420, the angle grinder 420 is arranged on the polishing shaft 410, and the angle grinder is provided with a saw blade 421.

A specific number of the angle grinders 420 distributed on the polishing shaft 410 depends on a number of electrodes 701 on a module 700 (referring to FIG. 5), the specific function of which is to cut the electrodes 701 (connecting pieces) of the module with the saw blade 421 of the angle grinder 420 at the same time, so as to cut off circuit connection quickly and safely.

There are many kinds of decommissioned modules with different sizes received by recycling enterprises, but a number of modules of the same model are very limited. Therefore, a multi-piece cutting machine is required to adapt to different types of modules 700; otherwise, the multi-piece cutting machine is only applicable to one or a few types of modules 700. The newly designed angle grinder 420 can move along the polishing shaft 410 to adjust its position to match different modules.

Still further, the workbench 200 is provided with a translation feed device configured for controlling a translation movement of the workbench 200. In actual operation, by controlling the translational feed of the worktable 200 through the translational feed device, the angle grinder 420 can be close to the module 700 and cut off the electrode 701 (connecting piece) of the module 700 to complete the pole disconnecting step.

Adopting mechanical clamping and cutting instead of the original hand-held angle grinder, a saw blade for cutting aluminum alloy instead of the resin saw blade can be used as the saw blade 421 of the angle grinder, thus reducing the use cost and the times of replacing the saw blade, and significantly improving the working efficiency.

The device for cutting connection of the multi-piece module electrodes disclosed above is only a preferred embodiment of the present disclosure, and is only used to illustrate the technical solutions of the present disclosure, but not to limit the present disclosure. Those of ordinary skills in the art should understand that they can still modify or supplement the technical solutions described in the aforementioned technical solutions in combination with the existing technology, or replace some of the technical features equivalently. For example, the translation feed device may be arranged on the angle grinding device 400 to control the movement of the angle grinding device 400. However, these modifications or substitutions do not make the essences of the corresponding technical solutions deviate from the spirit and scope of the technical solutions of the embodiments of the present disclosure.

The following description will be combined with some embodiments, wherein the "embodiment" here refers to a specific feature, structure or characteristic that may be included in at least one implementation of the present application. "In this embodiment" appearing in different places in this specification does not all refer to the same embodiment, nor is it a separate or selective embodiment mutually exclusive of other embodiments. In addition, the details showing one or more embodiments do not refer to any particular order fixedly, nor do they constitute limitations on the present disclosure.

In Embodiment 1, the angle grinder 420 is provided with an angle grinder fixed mount 430. The angle grinder fixed mount 430 includes a square tube 431 and an angle grinder slider 432. The angle grinder 420 is inserted into the square tube, and the angle grinder slider 432 is sheathed on the polishing shaft 410 for fixing the angle grinder 420 conveniently, which is suitable for both specially developed angle grinders 420 and general angle grinders 420 in the market.

In this embodiment, optionally, the angle grinder 420 is tightened on the square tube 431 with four screws.

In this embodiment, optionally, in order to prevent the angle grinder 420 from shifting on the polishing shaft 410, the angle grinder 420 may be fixed on the polishing shaft 410 by a pentagon screw so that the angle grinder does not shift.

In Embodiment 2, the polishing shaft 410 extends along left and right directions, at least two polishing shafts are corresponding to one angle grinder 420, and the polishing shafts 410 are arranged along upper and lower directions to prevent the angle grinder 420 from shaking and shifting in the polishing shafts 410.

In Embodiment 3, a plurality of groups of polishing shafts 410 are included, each group of the polishing shafts 410 is corresponding to a plurality of the angle grinders 420, and each group of the polishing shafts 410 is arranged along front and back directions As a width of a hand-held angle grinder is generally 60 mm, if the clamping of the angle grinder is considered, a distance between circular saw blades of two angle grinders is at least about 70 mm. In order to cut the module 700 with a small single module distance (i.e., small d value), a method of arranging a plurality of rows of angle grinders at intervals may be adopted in this art, thus solving the problem of cutting the pole pieces of the module with small distance. Taking the layout of two rows as an example (referring to FIG. 2), when the second row and the first row are arranged at intervals, a minimum distance of the circular saw blades will be reduced from d to d/2, so that cutting may be realized when the minimum distance between the single modules 700 is no less than 35 mm, and this spacing can be adapted to most modules 700.

If d is less than 35 mm, the layout of two rows cannot meet the requirements. A solution is to arrange three rows side by side, and the distance between the minimum circular saw blades may reach d/3 (23.3 mm). It can be seen that this spacing can cover almost all modules 700.

In Embodiment 4, the angle grinding device 400 includes a polishing shaft frame 440, and the polishing shaft 410 is arranged in the polishing shaft frame 440.

In this embodiment, two rows of polishing shafts 410 are installed in the polishing shaft frame 440, and there are two polishing shafts 410 in each row.

In Embodiment 5, the stand 100 is provided with a portal frame 110, and the angle grinding device 400 is arranged on the portal frame.

Figure 4:
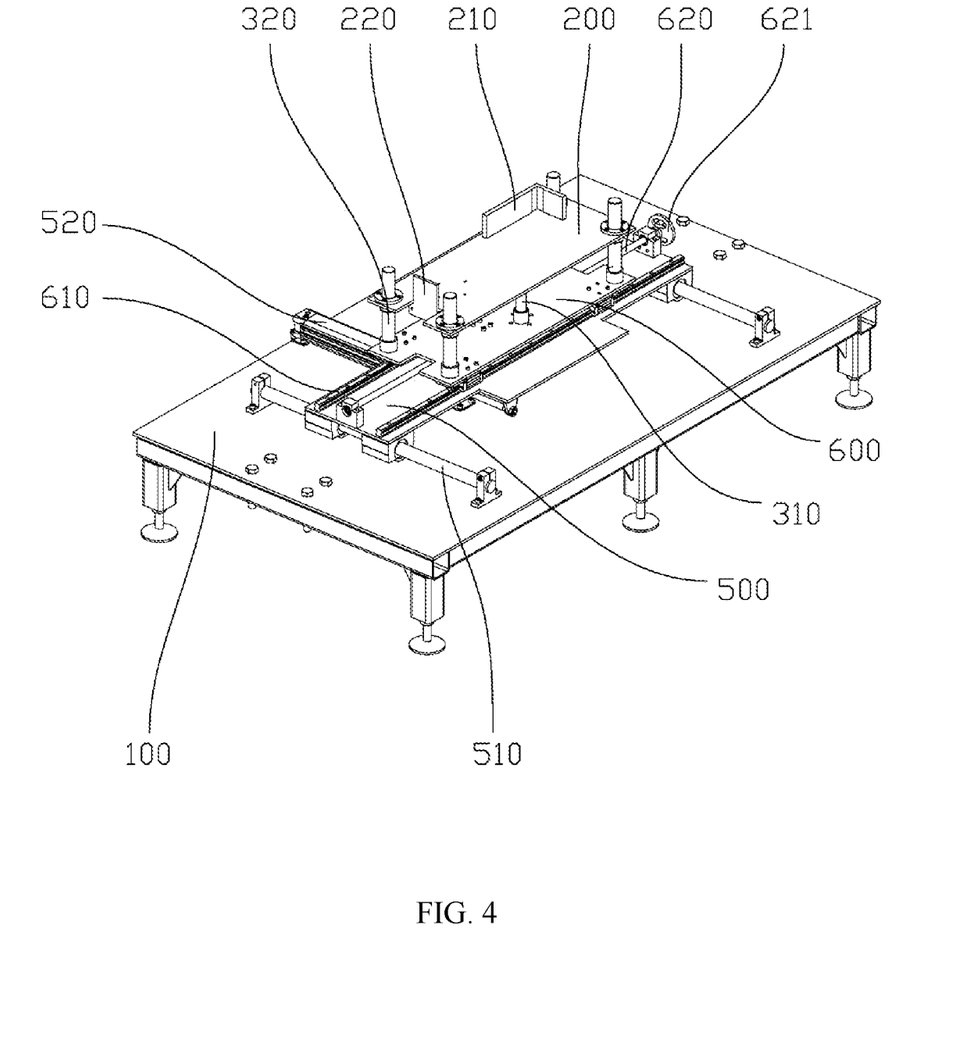
FIG. 4 is a three-dimensional diagram of a workbench in the present disclosure.

In Embodiment 6, referring to FIG. 4, the stand 100 is provided with a longitudinal guide rod 510, the longitudinal guide rod 510 is provided with a longitudinal translation frame 500, and the longitudinal translation frame 500 may translate back and forth along the longitudinal guide rod 510.

The longitudinal translation frame 500 is provided with a transverse guide rail 610, the transverse guide rail 610 is provided with a transverse translation frame 600, the workbench 200 is arranged on the transverse translation frame 600, and the transverse translation frame 600 may translate left and right along the transverse guide rail 610.

The height adjusting device 300 is arranged between the workbench 200 and the transverse translation frame 600.

In Embodiment 7, the workbench 200 is provided with an L-shaped fixing plate 210, and the workbench 200 is provided with a movable clamping plate 220.

In this embodiment, optionally, in order to clamp the module 700 to fix the module in the process of pole disconnecting, a biaxial cylinder is installed under the workbench 200, and the biaxial cylinder clamps and releases the module 700 through the clamping plate 220 installed thereon.

In Embodiment 8, the height adjusting device 300 includes a height adjusting screw rod 310 and a lifting guide rod 320, so that the worktable 200 can stably move in parallel with an operating table all the time, thus ensuring the accuracy of the relative position between the module 700 and the circular saw blade of the angle grinder above, i.e., ensuring the cutting accuracy.

In Embodiment 9, the longitudinal translation frame 500 is provided with a longitudinal translation cylinder 520. That is, the longitudinal translation cylinder 520 is used as the translation feed device, and during specific work, the workbench 200 is controlled to translate by the longitudinal translation cylinder 520 to realize the feeding step, while the angle grinder 420 can complete the pole disconnecting step without moving.

The longitudinal translation frame 500 is provided with a trapezoidal screw rod 620, the trapezoidal screw rod 620 is provided with a hand wheel 621, the trapezoidal screw rod 620 is provided with a trapezoidal nut, and the trapezoidal nut is connected with the transverse translation frame 600. By shaking the hand wheel 621, an operator can drive the trapezoidal nut to move in left and right directions, and then move a center plate in the left and right directions.

In Embodiment 10, the left and right directions are defined as an X axis, the front and rear directions are defined as a Y axis, and the upper and lower directions are defined as a Z axis.

Two parallel longitudinal guide rods 510 are placed on the stand 100 of the device for cutting connection of the multi-piece module electrodes along the Y axis direction, each guide shaft is fixed on the operating table by screws through two fixing seats, each guide shaft is provided with two linear bearing, and these four linear bearing are connected with the longitudinal translation frame 500 by screws.

Two transverse guide rails 610 are placed on the longitudinal translation frame 500 in parallel along the X axis direction, each linear guide rail has two sliders, and four sliders are fixedly connected with the transverse translation frame 600 by screws.

The transverse translation frame 600 is provided with four vertical lifting guide rods 320, and lower ends of the lifting guide rods 320 are fixedly connected with the transverse translation frame 600 by screws through supports; the other end of each lifting guide rod 320 is provided with a sliding bearing, and the four sliding bearings are fixedly mounted on the workbench 200 by screws.

The workbench 200, the transverse translation frame 600 and the longitudinal translation frame 500 are arranged from top to bottom and divided into upper, middle and lower layers.

The workbench 200 is welded with the L-shaped fixing plate 210 for positioning a workpiece (module 700), and the biaxial cylinder is installed under the workbench 200, and the biaxial cylinder clamps and releases the module 700 through the clamping plate installed thereon.

Figure 5:
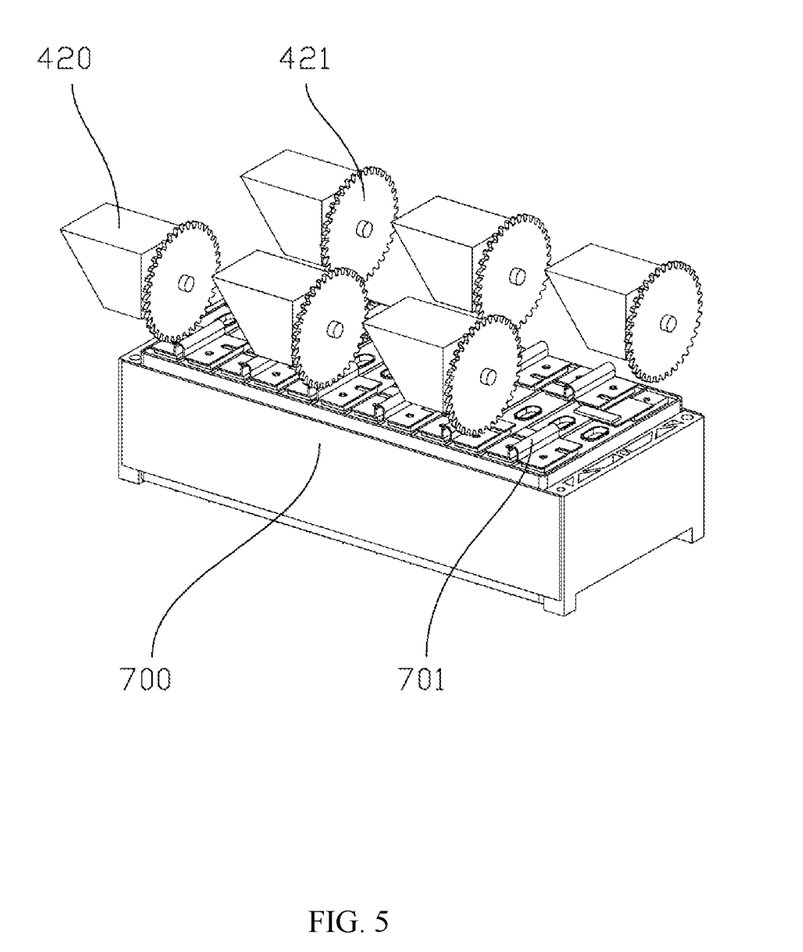
FIG. 5 is a schematic diagram illustrating working of the present disclosure.

The working process of the device for cutting connection of the multi-piece module electrodes is as follows:

1. First, the module 700 waiting for pole disconnecting is placed on the workbench 200 and leans against the L-shaped fixing plate 210, and then an air circuit is opened to make the clamping plate 220 driven by the biaxial cylinder clamp the module 700 to keep the module fixed.
2. By screwing a hexagon head on the screw rod with a wrench, the workbench 200 may be adjusted up and down to move along the Z axis. Under the guidance of four vertical axes, the module 700 may be fixed at a suitable height position, which enables the circular saw blade to easily cut off the arched part connected with the pole piece on the module 700 in height.
3. By shaking the hand wheel, the arched pole pieces between the single modules are aligned with the circular saw blades of the angle grinder in the X axis direction.
4. After adjusting the position of the module 700 in the X and Z axes, the air circuit may be operated to make the cylinder push an ear rim and then drive the module 700 to realize the feeding movement in the Y axis direction. Because the saw blades 421 among six angle grinders 420 are adjusted in the X axis direction in advance, that is, each circular saw blade faces the arched pole piece (electrode 701) of the module 700, and the height of the module 700 (i.e., the Z axis direction) is also suitable for the pole disconnecting generated by the circular saw blade, pole disconnecting will be carried out on one side bus of the module 700 in one feeding process of the Y axis.

Since the dimensional errors of the modules 700 of the same type are not large, which are basically less than 0.5 mm, once the X axis and the Z axis are adjusted for modules 700 of the same batch, steps 1 and 4 may be directly operated without adjustment in the subsequent pole disconnecting process.

According to the above principles, the above embodiments of the present disclosure may also be appropriately changed and modified. Therefore, the present disclosure is not limited to the specific embodiments disclosed and described above, and some modifications and changes to the present disclosure should also fall within the protection scope of the claims of the present disclosure.

Practice has proved that the new technology has the following advantages in comparison to the existing technology.

1. The new technology is matched with the hand-held angle grinders widely sold in the market, compared with a non-standard circular saw blade cutting device, the angle grinder is not only significantly lower in price than the self-made part, but also significantly superior to the self-made part in performance and reliability. The reason is that: compared with self-made and special non-standard customized devices, the advantages of mature and mass-used general devices are well known.
2. In the future maintenance, the cutting part is naturally the focus of maintenance, and even if one angle grinder is replaced as a whole, one angle grinder will cost several hundred Yuan only, but the maintenance costs of the special and self-made devices will increase several times. At the same time, it is convenient and quick to replace the angle grinder, while it is much more complicated to replace the special devices.

The invention claimed is:

1. A device for cutting connections of multi-piece module electrodes, comprising a stand, wherein the stand is provided with a workbench, and the workbench is connected with a height adjusting device; and further comprising an angle grinding device, wherein the angle grinding device comprises polishing shafts and angle grinders, the angle grinders are arranged on the polishing shafts, spacing between the angle grinders is adjustable along the polishing shafts, and each of the angle grinders is provided with a saw blade;

the workbench is provided with a translation feed device configured for controlling a translation movement of the workbench;

wherein the stand is provided with a longitudinal guide rod, the longitudinal guide rod is provided with a longitudinal translation frame, the longitudinal translation frame is provided with a transverse guide rail, the transverse guide rail is provided with a transverse translation frame, the workbench is arranged on the transverse translation frame, and the height adjusting device is arranged between the workbench and the transverse translation frame.

2. The device of claim 1, wherein each of the angle grinders is provided with an angle grinder fixed mount, the angle grinder fixed mount comprises a square tube and an angle grinder slider, each of the angle grinders is inserted into the respective square tube, and the respective angle grinder slider is sheathed on the polishing shafts.

3. The device of claim 1, wherein the polishing shafts extends along left and right directions, at least two polishing shafts are corresponding to one of the angle grinders, and the polishing shafts are arranged along upper and lower directions.

4. The device of claim 3, wherein a plurality of groups of polishing shafts are provided, each group of the polishing shafts is corresponding to a plurality of the angle grinders, and each group of the polishing shafts is arranged along front and back directions.

5. The device of claim 4, wherein the angle grinding device comprises a polishing shaft frame, and the plurality of groups of polishing shafts are arranged in the polishing shaft frame.

6. The device of claim 1, wherein the angle grinding device comprises a polishing shaft frame, and the polishing shafts is arranged in the polishing shaft frame.

7. The device of claim 1, wherein the stand is provided with a portal frame, and the angle grinding device is arranged on the portal frame.

8. The device of claim 1, wherein the workbench is provided with an L-shaped fixing plate, and the workbench is provided with a movable clamping plate.

9. The device of claim 1, wherein the height adjusting device comprises a height adjusting screw rod and a lifting guide rod.

10. The device of claim 1, wherein the longitudinal translation frame is provided with a longitudinal translation cylinder, the longitudinal translation frame is provided with a trapezoidal screw rod, the trapezoidal screw rod is provided with a hand wheel, the trapezoidal screw rod provided with a trapezoidal nut, and the trapezoidal nut is connected with the transverse translation frame.

* * * * *